L. THOMPSON.
Pruning-Machine for Vines and Plants.
No. 218,795. Patented Aug. 19, 1879.
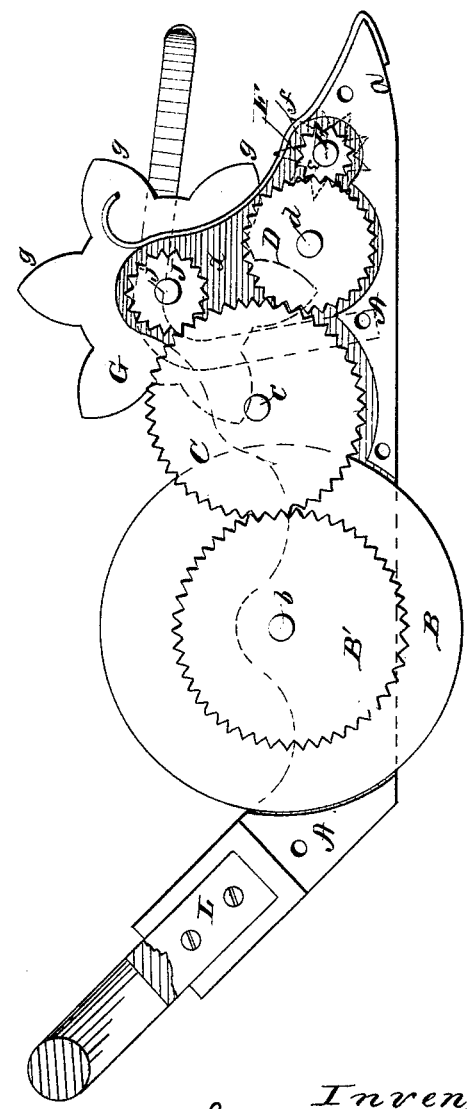
Witnesses,
P. L. Ormond
E. H. Bradford
Inventor,
Lawrence Thompson
By H. P. Ennis
Attorney

UNITED STATES PATENT OFFICE.

LAWRENCE THOMPSON, OF MILLWOOD, OHIO.

IMPROVEMENT IN PRUNING-MACHINES FOR VINES AND PLANTS.

Specification forming part of Letters Patent No. 218,795, dated August 19, 1879; application filed May 16, 1879.

*To all whom it may concern:*

Be it known that I, LAWRENCE THOMPSON, of Millwood, in the county of Knox and State of Ohio, have invented certain new and useful Improvements in Pruning-Machines for Vines and Plants; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

My invention relates to a device for agricultural purposes, the same being adapted to cut away the runners, creepers, and the like between rows of vines, bushes, &c.

In carrying out my invention, I employ a proper frame, in which is journaled the operating mechanism of the device. The frame is provided with handles and a proper shoe-front, and may be adapted to run on one or more wheels. As shown, it is a device adapted to ride upon one wheel, such wheel being the driving-wheel of the operating mechanism.

The object of the device is to cut the runners and creepers between rows; and to this end the operating mechanism consists of a riding-wheel with rigid cog-wheel attached or formed in one therewith. This latter-mentioned gear meshes with a communicating cog-wheel, which, in turn, meshes with a pinion upon a wheel provided with revolving knives, and also with an auxiliary gear connecting with a smaller wheel which revolves in an opposite direction.

The driving-wheel, which constitutes the main or operating wheel, sets the train of gear in motion, the cutting-wheel severs the runners or vines, the shoe passes under and elevates them, and the lower wheel feeds them to the cutter, as will readily be observed.

Referring to the drawing, A represents the frame, having handle L, preferably adjustable, and beveled running-shoe $a$, as shown.

Journaled in the frame A at $b$ is a riding-wheel, B, and rigid therewith is a gear-wheel, B', which meshes with a communicating gear, C, journaled also in the frame A at $c$.

The gear-wheel C meshes above with a pinion, J, rigid upon a shaft, $j$, which also carries a wheel, G, provided with cutting-knives $g$, as shown. The communicating gear C also meshes with a toothed wheel, D, journaled at $d$, and this transmits motion to a gear, E, upon a shaft, $e$, carrying radial knives or arms $f$, as shown.

The shoe rides along the surface between the rows and elevates the vines. The feeder F $f$ elevates them and brings them into immediate contact with the cutter G $g$, the rotary motion being imparted by the riding and driving wheel B B', as is obvious.

Changes and modifications may be made in this device without departing from the principle of the invention—such, for instance, as duplicating or triplicating the operating mechanism to operate two or more rows at once, arranging the handles to correspond, &c.

What I claim, and desire to secure by Letters Patent, is—

1. In a machine for pruning vines and plants between the rows, the combination of a cutting-wheel, for severing the vines, and a wheel arranged below, for elevating and feeding them to the cutter, substantially as described.

2. The combination of the driving and riding wheel B B' with the cutting-wheel G $g$, shoe $a$, and feeder E $f$, and with the connecting train of gear, as and for the purposes specified.

In testimony that I claim the foregoing I have hereunto set my hand and seal this 3d day of May, 1879.

LAWRENCE THOMPSON. [L. S.]

Witnesses:
 ULYSSES KINSEY,
 J. D. HORN.